US012119562B2

(12) United States Patent
Hung et al.

(10) Patent No.: US 12,119,562 B2
(45) Date of Patent: Oct. 15, 2024

(54) ANTENNA DEVICE AND METHOD OF MANUFACTURING THEREOF

(71) Applicant: AU Optronics Corporation, Hsin-Chu (TW)

(72) Inventors: Ching-Lang Hung, Hsin-Chu (TW); Chia-Wei Kuo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 18/322,781

(22) Filed: May 24, 2023

(65) Prior Publication Data

US 2023/0307834 A1 Sep. 28, 2023

Related U.S. Application Data

(62) Division of application No. 17/391,085, filed on Aug. 2, 2021.

(30) Foreign Application Priority Data

Mar. 24, 2021 (TW) ................................ 110110672

(51) Int. Cl.

| | |
|---|---|
| ***H01Q 5/35*** | (2015.01) |
| ***H01Q 1/50*** | (2006.01) |
| ***H01Q 21/24*** | (2006.01) |
| ***H01Q 21/28*** | (2006.01) |

(52) U.S. Cl.

CPC ................ *H01Q 5/35* (2015.01); *H01Q 1/50* (2013.01); *H01Q 21/245* (2013.01); *H01Q 21/28* (2013.01)

(58) Field of Classification Search

CPC .. H01Q 1/32; H01Q 1/34; H01Q 1/50; H01Q 5/35; H01Q 9/46; H01Q 13/10; H01Q 13/103; H01Q 21/0006; H01Q 21/061; H01Q 21/245; H01Q 21/28

See application file for complete search history.

(56) References Cited

U.S. PATENT DOCUMENTS

| | | | |
|---|---|---|---|
| 10,686,636 | B2 | 6/2020 | Bowen et al. |
| 10,944,174 | B2 | 3/2021 | Hsieh et al. |
| 2009/0009417 | A1 | 1/2009 | Matsushita |
| 2021/0280984 | A1 | 9/2021 | Tanaka |

FOREIGN PATENT DOCUMENTS

| | | | |
|---|---|---|---|
| CN | 105356063 | A | 2/2016 |
| CN | 108321551 | A | 7/2018 |

*Primary Examiner* — Robert Karacsony

(74) *Attorney, Agent, or Firm* — WPAT, P.C

(57) ABSTRACT

An antenna device includes first to third antenna units and a feed-in line. An angle between the second antenna unit and the first antenna unit is substantially equal to 90 degrees. An angle between the third antenna unit and the first antenna unit is substantially equal to 90 degrees. The feed-in line crosses over each of the first to third antenna units in a view, and is configured to turn on and turn off each of the first to third antenna units. The first antenna unit and the second antenna unit are configured to generate a first polarized signal, the third antenna unit and the second antenna unit are configured to generate a second polarized signal, and the first polarized signal and the second polarized signal have different polarizations.

16 Claims, 7 Drawing Sheets

ANTENNA DEVICE AND METHOD OF MANUFACTURING THEREOF

CROSS-REFERENCE TO RELATED APPLICATION

This application is a divisional application of U.S. application Ser. No. 17/391,085, filed on Aug. 2, 2021, which claims priority to Taiwan Application Serial Number 110110672, filed Mar. 24, 2021, which is herein incorporated by reference in its entirety.

BACKGROUND

Technical Field

The present disclosure relates to an antenna technology. More particularly, the present disclosure relates to an antenna device.

Description of Related Art

Transportations such as airplanes and boats may generate polarized signals by antenna devices, and transmit the polarized signals to satellites for performing communications. However, under different conditions, the antenna devices may need to generate left circular polarized signals or right circular signals corresponding to different requirements. Thus, techniques associated with the development for overcoming the problems described above are important issues in the field.

SUMMARY

The present disclosure provides an antenna device. The antenna device includes a first antenna unit, a second antenna unit, a third antenna unit and a feed-in line. An angle between the second antenna unit and the first antenna unit is substantially equal to 90 degrees. An angle between the third antenna unit and the first antenna unit is substantially equal to 90 degrees. The feed-in line crosses over each of the first antenna unit, the second antenna unit and the third antenna unit in a view, and is configured to turn on and turn off each of the first antenna unit, the second antenna unit and the third antenna unit. The first antenna unit and the second antenna unit are configured to generate a first polarized signal, the third antenna unit and the second antenna unit are configured to generate a second polarized signal, and the first polarized signal and the second polarized signal have different polarizations.

The present disclosure provides a method of manufacturing an antenna device. The method includes: disposing a first antenna unit; disposing a second antenna unit approximately perpendicular to the first antenna unit; disposing a third antenna unit approximately parallel with the first antenna unit; and disposing a feed-in line crossing over each of the first antenna unit, the second antenna unit and the third antenna unit in a view. The feed-in line is configured to enable and disable each of the first antenna unit, the second antenna unit and the third antenna unit, the first antenna unit and the second antenna unit are configured to generate a first polarized signal, the third antenna unit and the second antenna unit are configured to generate a second polarized signal, and the first polarized signal and the second polarized signal have different polarizations.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
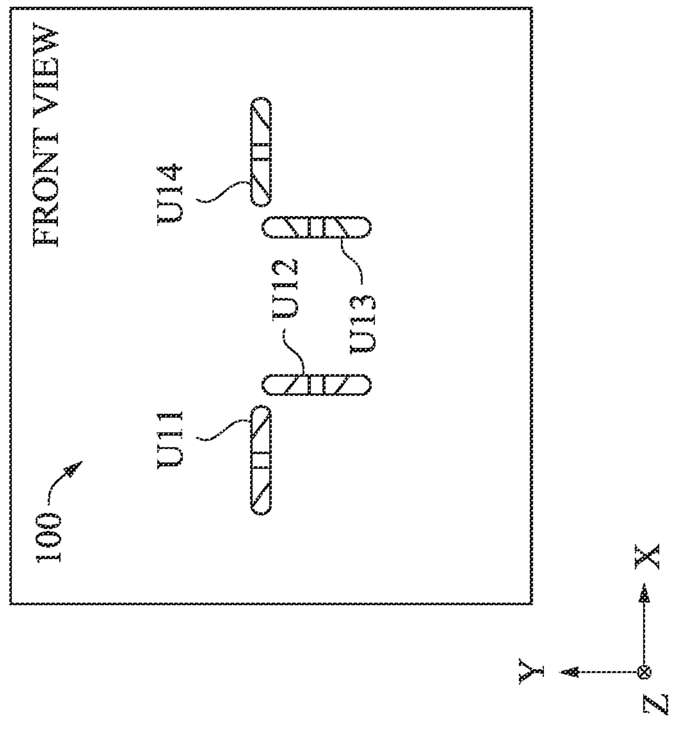
FIG. 1A is a front view diagram of an antenna device illustrated according to one embodiment of this disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Reference will now be made in detail to the present embodiments of the disclosure, examples of which are illustrated in the accompanying drawings. Wherever possible, the same reference numbers are used in the drawings and the description to refer to the same or like parts.

FIG. 1A is a front view diagram of an antenna device 100 illustrated according to one embodiment of this disclosure. In some embodiments, the antenna device 100 is configured to generate polarized signals.

The front view diagram shown in FIG. 1A includes an X axis, a Y axis and a Z axis which are perpendicular to each other. The X axis, the Y axis and the Z axis correspond to an X direction, a Y direction and a Z direction, respectively. In FIG. 1A, the Z direction is the direction pointing out from the paper.

As illustratively shown in FIG. 1A, the antenna device 100 includes antenna units U11-U14. Long sides of the antenna units U11 and U14 are parallel with the Y direction and perpendicular to the X direction. Long sides of the antenna units U12 and U13 are parallel with the X direction and perpendicular to the Y direction. In other words, an angle between the antenna units U11 and U12 is substantially equal to 90 degrees, and an angle between the antenna units U14 and U13 is substantially equal to 90 degrees.

Figure 1B:
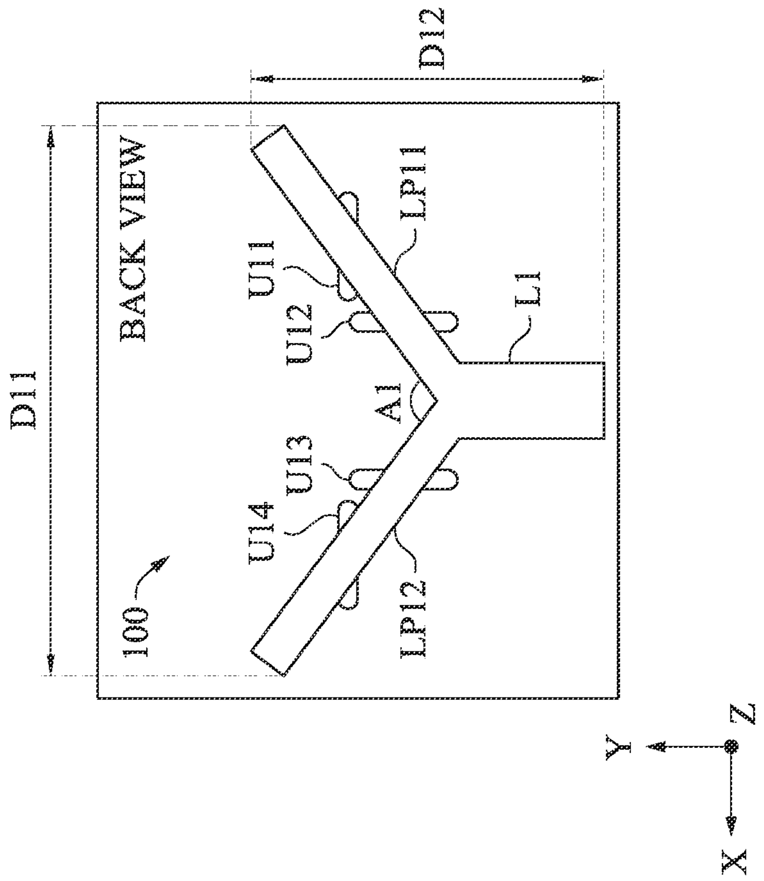
FIG. 1B is a back view diagram of an antenna device illustrated according to one embodiment of this disclosure.

FIG. 1B is a back view diagram of an antenna device illustrated according to one embodiment of this disclosure. As illustratively shown in FIG. 1B, the antenna device 100 has a length D11 in the X direction, and has a length D12 in the Y direction. In some embodiments, the length D11 is approximately 0.9 times of the wave length of a signal generated by the antenna device 100, and the length D12 is approximately 0.8 times of the wave length of the signal generated by the antenna device 100. In various embodiments, the lengths D11 and D12 may be various lengths.

The back view diagram shown in FIG. 1B includes the X axis, the Y axis and the Z axis which are perpendicular to each other. The X axis, the Y axis and the Z axis correspond to the X direction, the Y direction and the Z direction, respectively. In FIG. 1B, the Z direction is the direction pointing into the paper.

As illustratively shown in FIG. 1B, the antenna device 100 includes the antenna units U11-U14 and a feed-in line L1. In some embodiments, the feed-in line L1 is configured to provide driving signals to the antenna units U11-U14, such that the antenna units U11-U14 generate corresponding polarized signals.

As illustratively shown in FIG. 1B, the feed-in line L1 includes feed-in line portions LP11 and LP12. An angle A1 between the feed-in line portions LP11 and LP12 is substantially equal to 120 degrees, an angle between the feed-in line portion LP11 and the X axis is substantially equal to 150 degrees, and an angle between the feed-in line portion LP12 and the X axis is substantially equal to 30 degrees.

In some embodiments, the antenna units U11 and U12 are disposed on the feed-in line portion LP11, and configured to receive the driving signals from the feed-in line portion LP11. In some embodiments, the antenna units U13 and U14 are disposed on the feed-in line portion LP12, and configured to receive the driving signals from the feed-in line portion LP12.

In some embodiments, each of the antenna units U11 and U14 is configured to generate a linear polarized signal which is parallel with the Y direction, and each of the antenna units U12 and U13 is configured to generate a linear polarized signal which is parallel with the X direction.

In some embodiments, the linear polarized signal which is parallel with the Y direction and the linear polarized signal which is parallel with the X direction can be combined to generate circular polarized signals which are parallel with the X-Y surface, such as right circular polarized signals and left circular polarized signals. In some embodiments, the antenna units U11 and U12 are configured to generate the right circular polarized signals which are parallel with the X-Y surface, and the antenna units U13 and U14 are configured to generate the left circular polarized signals which are parallel with the X-Y surface.

In some embodiments, the feed-in line L1 is further configured to provide control signals to one or more of the antenna units U11-U14, to enable or disable the one or more of the antenna units U11-U14, such that the antenna device 100 generates different polarized signals corresponding to different turned on or turned off states of the antenna units U11-U14. For example, when the antenna units U11 and U12 are turned off and the antenna units U13 and U14 are turned on, the antenna device 100 generates a left circular polarized signal. In contrast, when the antenna units U13 and U14 are turned off and the antenna units U11 and U12 are turned on, the antenna device 100 generates a right circular polarized signal. A specific way of turning on or turning off one or more of the antenna units U11-U14 are described below with respect to an embodiment shown in FIG. 1C.

Figure 1C:
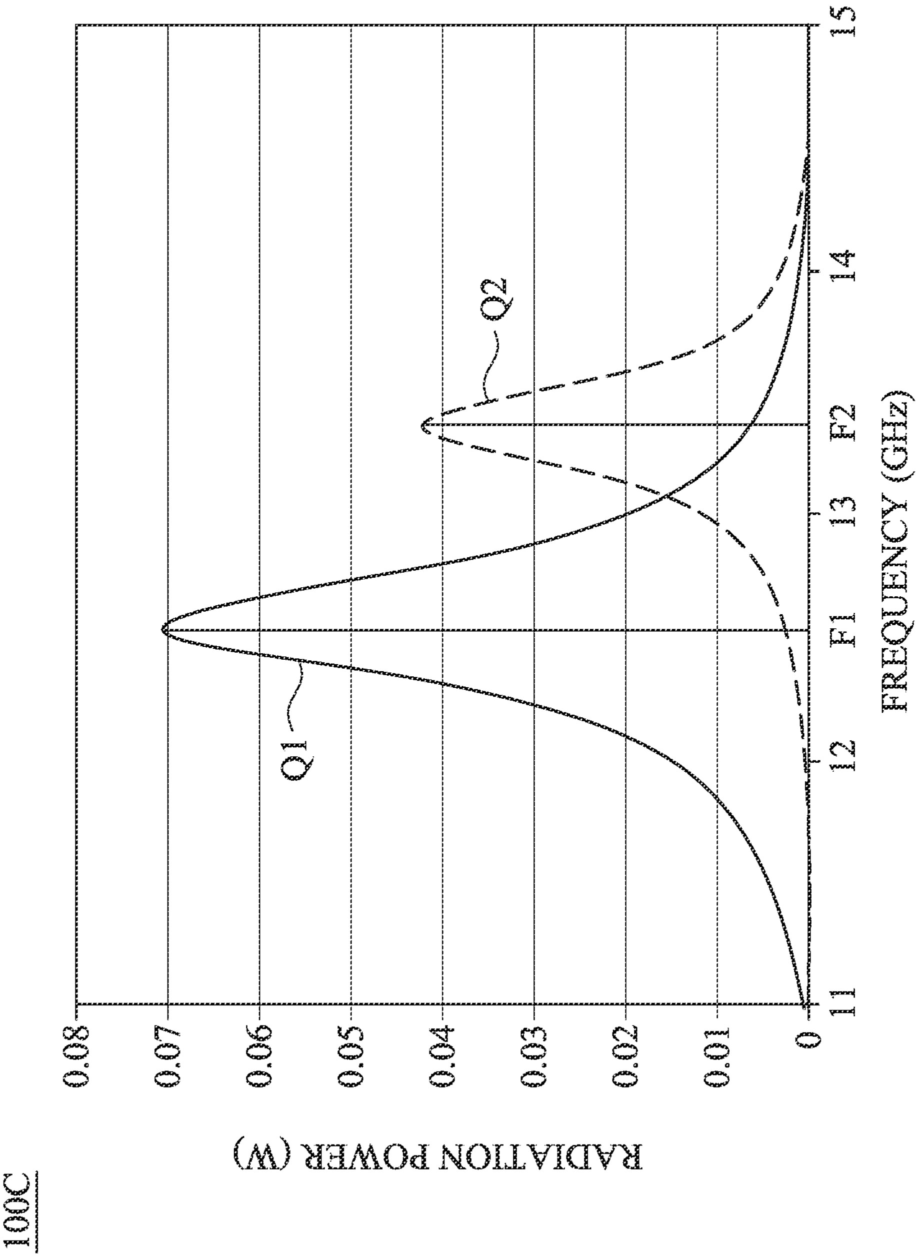
FIG. 1C is a schematic diagram of antenna features when turning on or turning off an antenna unit illustrated according to one embodiment of this disclosure.

FIG. 1C is a schematic diagram 100C of antenna features when turning on or turning off the antenna unit U11 illustrated according to one embodiment of this disclosure. In the embodiment shown in FIG. 1C, for illustration purpose, the antenna features of the antenna unit U11 are described as an example, but embodiments of the present disclosure are not limited thereto. In some embodiments, the antenna units U12-U14 may have the antenna features shown in FIG. 1C. Antenna units U31-U33 and U51-U53 shown in FIGS. 3A, 3B, 5A and 5B may also have the antenna features shown in FIG. 1C.

As illustratively shown in FIG. 1C, a horizontal axis of the schematic diagram 100C corresponds to a frequency of a signal generated by the antenna unit U11, and a vertical axis of the schematic diagram 100C corresponds to a signal intensity (that is, the radiation power) of the signal generated by the antenna unit U11.

As illustratively shown in FIG. 1C, the schematic diagram 100C includes curves Q1 and Q2. The curve Q1 corresponds to the antenna features when the antenna unit U11 is turned on, and the curve Q2 corresponds to the antenna features when the antenna unit U11 is turned off.

In some embodiments, a signal intensity of the signal generated by the antenna unit U11 at a resonance frequency is larger than signal intensities at other frequencies. As shown by the curves Q1 and Q2, when the antenna unit U11 is turned on, the resonance frequency of the antenna unit U11 is F1. When the antenna unit U11 is turned off, the resonance frequency of the antenna unit U11 is F2.

As illustratively shown in FIG. 1C, the signal intensity of the signal having the frequency F1 when the antenna unit U11 is turned on is much larger than the signal intensity of the signal having the frequency F1 when the antenna unit U11 is turned off. In some embodiments, the signal intensity when the antenna unit U11 is turned on is 25 times of the signal intensity when the antenna unit U11 is turned off. In some embodiments, one can consider that the antenna unit U11 generates the signal having the frequency F1 when the antenna unit U11 is turned on, and the antenna unit U11 does not generate the signal having the frequency F1 when the antenna unit U11 is turned off.

In some embodiments, the feed-in line L1 adjusts a dielectric coefficient of the antenna unit U11 by voltages of the control signals to turn on or turn off the antenna unit U11, but the present disclosure is not limited thereto. In various embodiments, other methods of turning on or turning off the antenna unit U11 are contemplated as being within the scope of the present disclosure.

Figure 2:
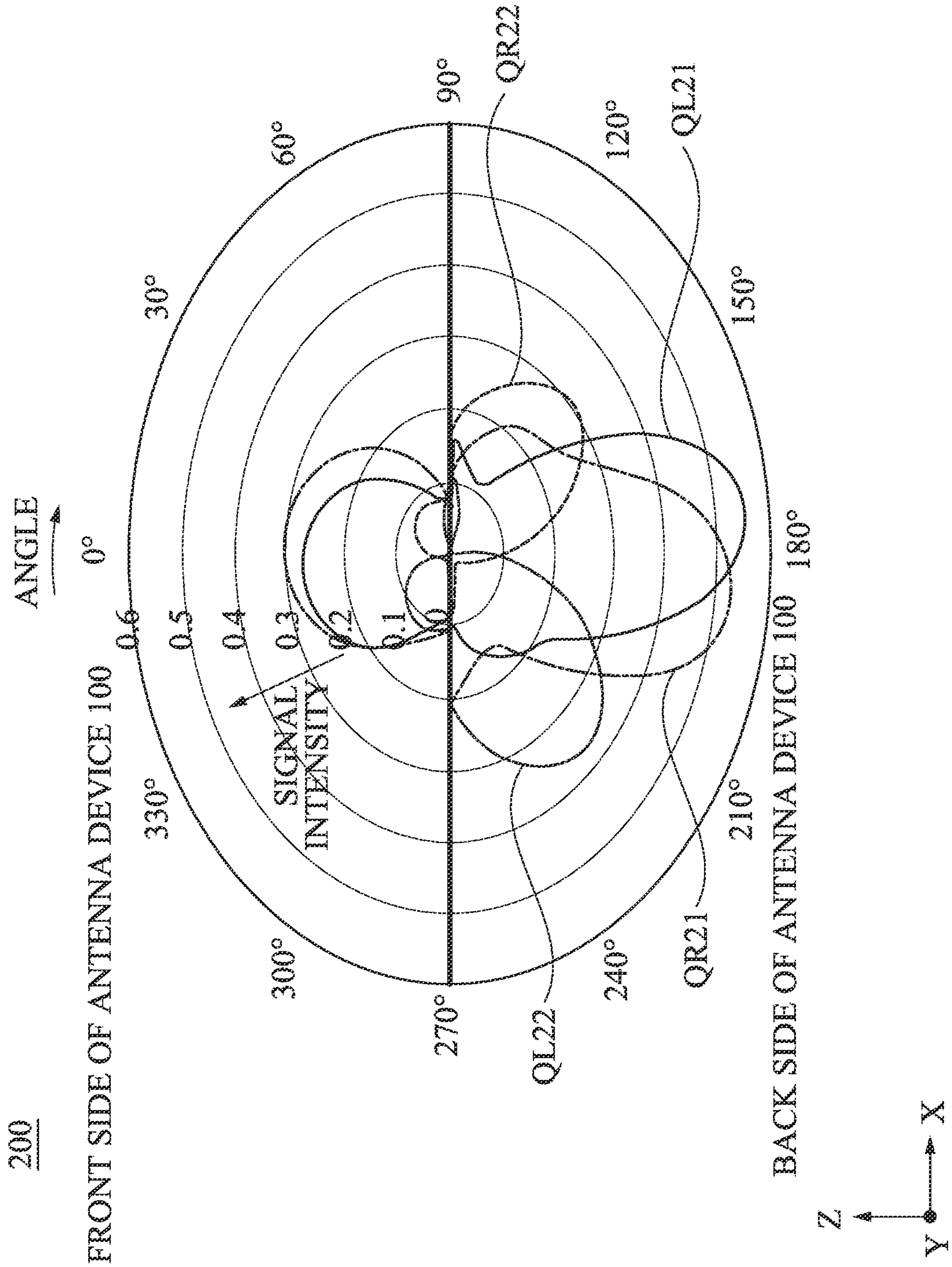
FIG. 2 is a schematic diagram of antenna features of an antenna device illustrated according to one embodiment of this disclosure.

FIG. 2 is a schematic diagram 200 of antenna features of an antenna device 100 illustrated according to one embodiment of this disclosure. The schematic diagram 200 includes an X axis, a Y axis and a Z axis which are perpendicular to each other. The X axis, the Y axis and the Z axis correspond to the X direction, the Y direction and the Z direction, respectively. In FIG. 2, the Y direction is the direction pointing out from the paper. Referring to FIG. 1A and FIG. 2, the schematic diagram 200 corresponds to signal intensities at different angles on the X-Z surface as observing the antenna device 100 from the Y direction. In some embodiments, the position of the antenna device 100 corresponds to the center of the schematic diagram 200.

As illustratively shown in FIG. 2, the schematic diagram 200 includes curves QL21, QL22, QR21 and QR22. Referring to FIG. 1A and FIG. 2, the curve QL21 corresponds to a signal intensity of a left circular polarized signal generated by the antenna device 100 when the antenna units U11 and U12 are turned off and the antenna units U13 and U14 are turned on. The curve QL22 corresponds to a signal intensity of a right circular polarized signal generated by the antenna device 100 when the antenna units U11 and U12 are turned off and the antenna units U13 and U14 are turned on. The curve QR21 corresponds to a signal intensity of a right circular polarized signal generated by the antenna device 100 when the antenna units U13 and U14 are turned off and the antenna units U11 and U12 are turned on. The curve QR22 corresponds to a signal intensity of a left circular polarized signal generated by the antenna device 100 when the antenna units U13 and U14 are turned off and the antenna units U11 and U12 are turned on.

As shown by the curves QL21 and QL22, when the antenna units U11 and U12 are turned off and the antenna units U13 and U14 are turned on, the signal intensity of the left circular polarized signal is larger than the signal intensity of the right circular polarized signal. In some embodiments, a mode that the antenna units U11 and U12 are turned off and the antenna units U13 and U14 are turned on is referred to as a left circular polarized mode of the antenna device 100.

As shown by the curves QR21 and QR22, when the antenna units U13 and U14 are turned off and the antenna units U11 and U12 are turned on, the signal intensity of the right circular polarized signal is larger than the signal intensity of the left circular polarized signal. In some embodiments, a mode that the antenna units U13 and U14 are turned off and the antenna units U11 and U12 are turned on is referred to as a right circular polarized mode of the antenna device 100.

In some embodiments, in the left circular polarized mode of the antenna device 100, the signal intensity of the left circular polarized signal is 85 times of the signal intensity of the right circular polarized signal. In the right circular polarized mode of the antenna device 100, the signal intensity of the right circular polarized signal is 50 times of the signal intensity of the left circular polarized signal. In some embodiments, one may consider that the antenna device 100 generates the left circular polarized signal and does not generate the right circular polarized signal in the left circular polarized mode, and the antenna device 100 generates the right circular polarized signal and does not generate the left circular polarized signal in the right circular polarized mode.

In some embodiments, the feed-in line L1 controls the antenna device 100 to be switched between the left circular polarized mode and the right circular polarized mode by the control signals, such that the antenna device 100 generates the left circular polarized signal or the right circular polarized signal according to the control signals.

In some previous approaches, the antenna device cannot change polarization directions of signals generated by the antenna device. The antenna device can only generate signals with fixed polarization directions.

Compared to the above approaches, in some embodiments of the present disclosure, the antenna device 100 may generate the left circular polarized signal or the right circular polarized signal according to different requirements by turning on or turning off the antenna units U11-U14.

Figure 3A:
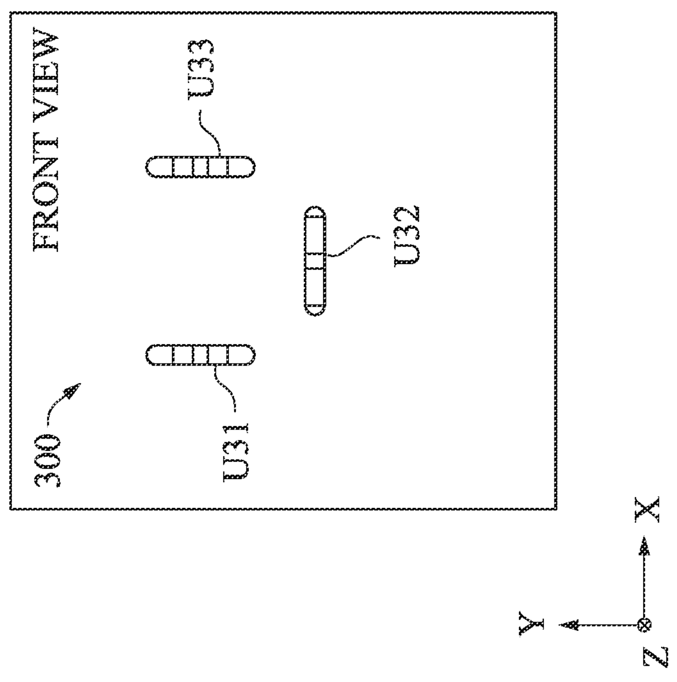
FIG. 3A is a front view diagram of an antenna device illustrated according to one embodiment of this disclosure.

FIG. 3A is a front view diagram of an antenna device 300 illustrated according to one embodiment of this disclosure. The antenna device 300 is an alternative embodiment of the antenna device 100 shown in FIG. 1A.

The front view diagram shown in FIG. 3A includes an X axis, a Y axis and a Z axis which are perpendicular to each other. The X axis, the Y axis and the Z axis correspond to the X direction, the Y direction and the Z direction, respectively. In FIG. 3A, the Z direction is the direction pointing out from the paper.

As illustratively shown in FIG. 3A, the antenna device 300 includes antenna units U31-U33. Long sides of the antenna units U31 and U33 are parallel with the Y direction and perpendicular to the X direction. A long side of the antenna unit U32 is parallel with the X direction and perpendicular to the Y direction. In other words, an angle between the antenna units U31 and U32 is substantially equal to 90 degrees, and an angle between the antenna units U33 and U32 is substantially equal to 90 degrees.

Figure 3B:
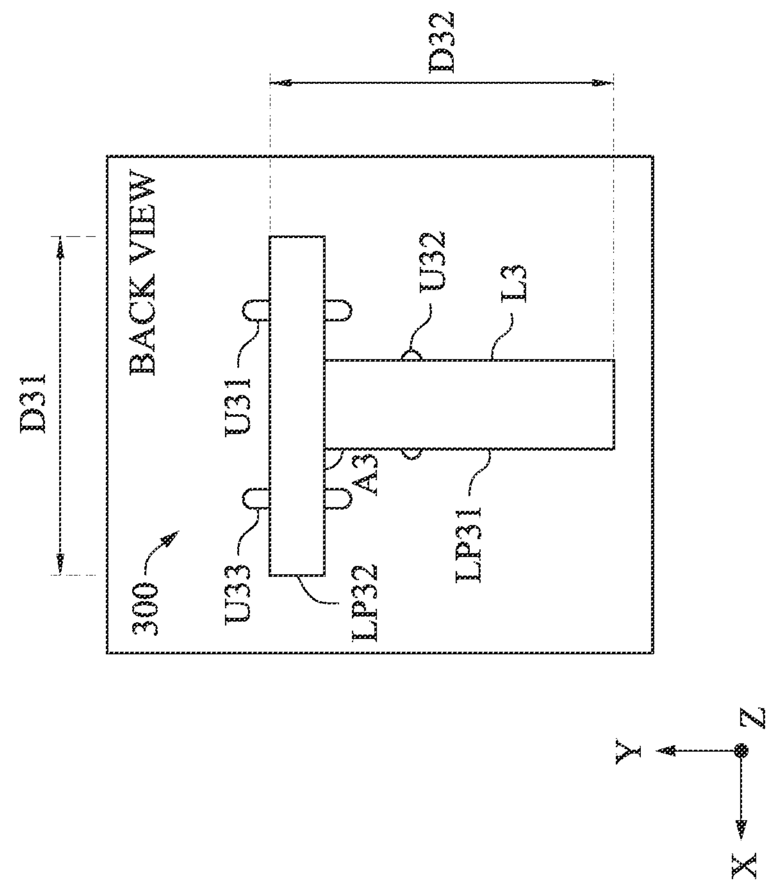
FIG. 3B is a back view diagram of an antenna device illustrated according to one embodiment of this disclosure.

FIG. 3B is a back view diagram of an antenna device 300 illustrated according to one embodiment of this disclosure. The antenna device 300 has a length D31 in the X direction, and has a length D32 in the Y direction. In some embodiments, the length D31 is approximately 0.7 times of the wave length of a signal generated by the antenna device 300, and the length D32 is approximately 0.5 times of the wave length of the signal generated by the antenna device 300. In various embodiments, the lengths D31 and D32 may be various lengths.

The back view diagram shown in FIG. 3B includes the X axis, the Y axis and the Z axis which are perpendicular to each other. The X axis, the Y axis and the Z axis correspond to the X direction, the Y direction and the Z direction, respectively. In FIG. 3B, the Z direction is the direction pointing into the paper.

As illustratively shown in FIG. 3B, the antenna device 300 includes the antenna units U31-U33 and a feed-in line L3. In some embodiments, the feed-in line L3 is configured to provide driving signals to the antenna units U31-U33, such that the antenna units U31-U33 generate corresponding polarized signals.

As illustratively shown in FIG. 3B, the feed-in line L3 includes feed-in line portions LP31 and LP32. The feed-in line portion LP31 is parallel with the Y direction and perpendicular to the X direction. The feed-in line portion LP32 is parallel with the X direction and perpendicular to the Y direction. An angle A3 between the feed-in line portions LP31 and LP32 is substantially equal to 90 degrees.

In some embodiments, the antenna units U31 and U33 are disposed on the feed-in line portion LP32, and configured to receive the driving signals from the feed-in line portion LP32. In some embodiments, the antenna units U32 is disposed on the feed-in line portion LP31, and configured to receive the driving signals from the feed-in line portion LP31.

In some embodiments, each of the antenna units U31 and U33 is configured to generate a linear polarized signal which is parallel with the Y direction, and the antenna unit U32 is configured to generate a linear polarized signal which is parallel with the X direction.

In some embodiments, the antenna units U31 and U32 are configured to generate the right circular polarized signals which are parallel with the X-Y surface, and the antenna units U33 and U32 are configured to generate the left circular polarized signals which are parallel with the X-Y surface.

In some embodiments, the feed-in line L3 is further configured to provide control signals to one or more of the antenna units U31-U33, to enable or disable the one or more of the antenna units U31-U33, such that the antenna device 300 generates different polarized signals corresponding to different turned on or turned off states of the antenna units U31-U33. For example, when the antenna unit U31 is turned off and the antenna units U32 and U33 are turned on, the antenna device 300 generates a left circular polarized signal by the antenna units U32 and U33. In contrast, when the antenna unit U33 is turned off and the antenna units U31 and U32 are turned on, the antenna device 300 generates a right circular polarized signal by the antenna units U31 and U32.

Figure 4:
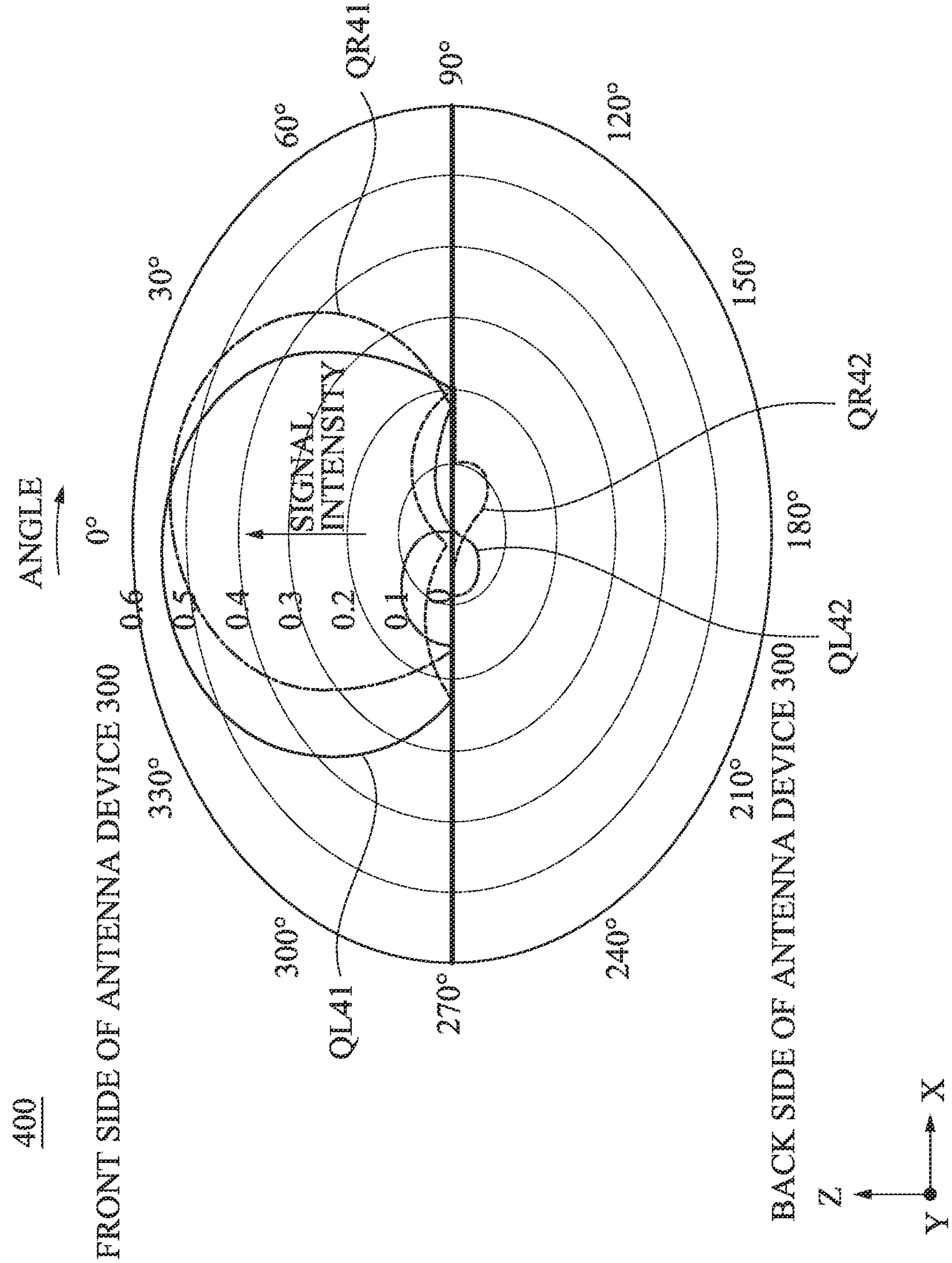
FIG. 4 is a schematic diagram of antenna features of an antenna device illustrated according to one embodiment of this disclosure.

FIG. 4 is a schematic diagram 400 of antenna features of the antenna device 300 illustrated according to one embodiment of this disclosure. The schematic diagram 400 includes an X axis, a Y axis and a Z axis which are perpendicular to each other. The X axis, the Y axis and the Z axis correspond to the X direction, the Y direction and the Z direction, respectively. In FIG. 4, the Y direction is the direction pointing out from the paper. Referring to FIG. 3A and FIG. 4, the schematic diagram 400 corresponds to signal intensities at different angles on the X-Z surface as observing the antenna device 300 from the Y direction. In some embodiments, the position of the antenna device 300 corresponds to the center of the schematic diagram 400.

As illustratively shown in FIG. 4, the schematic diagram 400 includes curves QL41, QL42, QR41 and QR42. Referring to FIG. 3A and FIG. 4, the curve QL41 corresponds to a signal intensity of a left circular polarized signal generated by the antenna device 300 when the antenna unit U31 is turned off and the antenna units U33 and U32 are turned on. The curve QL42 corresponds to a signal intensity of a right circular polarized signal generated by the antenna device 300 when the antenna unit U31 is turned off and the antenna units U33 and U32 are turned on. The curve QR41 corresponds to a signal intensity of a right circular polarized signal generated by the antenna device 300 when the antenna unit U33 is turned off and the antenna units U32 and U31 are turned on. The curve QR42 corresponds to a signal intensity of a left circular polarized signal generated by the antenna device 300 when the antenna unit U33 is turned off and the antenna units U32 and U31 are turned on.

As shown by the curves QL41 and QL42, when the antenna unit U31 is turned off and the antenna units U33 and U32 are turned on, the signal intensity of the left circular polarized signal is larger than the signal intensity of the right circular polarized signal. In some embodiments, a mode that the antenna unit U31 is turned off and the antenna units U33 and U32 are turned on is referred to as a left circular polarized mode of the antenna device 300.

As shown by the curves QR41 and QR42, when the antenna unit U33 is turned off and the antenna units U32 and U31 are turned on, the signal intensity of the right circular polarized signal is larger than the signal intensity of the left circular polarized signal. In some embodiments, a mode that the antenna unit U33 is turned off and the antenna units U32 and U31 are turned on is referred to as a right circular polarized mode of the antenna device 300.

In some embodiments, in the left circular polarized mode of the antenna device 300, the signal intensity of the left circular polarized signal is 950 times of the signal intensity of the right circular polarized signal. In the right circular polarized mode of the antenna device 300, the signal intensity of the right circular polarized signal is 1050 times of the signal intensity of the left circular polarized signal. In some embodiments, one may consider that the antenna device 300 generates the left circular polarized signal and does not generate the right circular polarized signal in the left circular polarized mode, and the antenna device 300 generates the right circular polarized signal and does not generate the left circular polarized signal in the right circular polarized mode.

In some embodiments, the feed-in line L3 controls the antenna device 300 to be switched between the left circular polarized mode and the right circular polarized mode by the control signals, such that the antenna device 300 generates the left circular polarized signal or the right circular polarized signal according to the control signals.

Figure 5B:
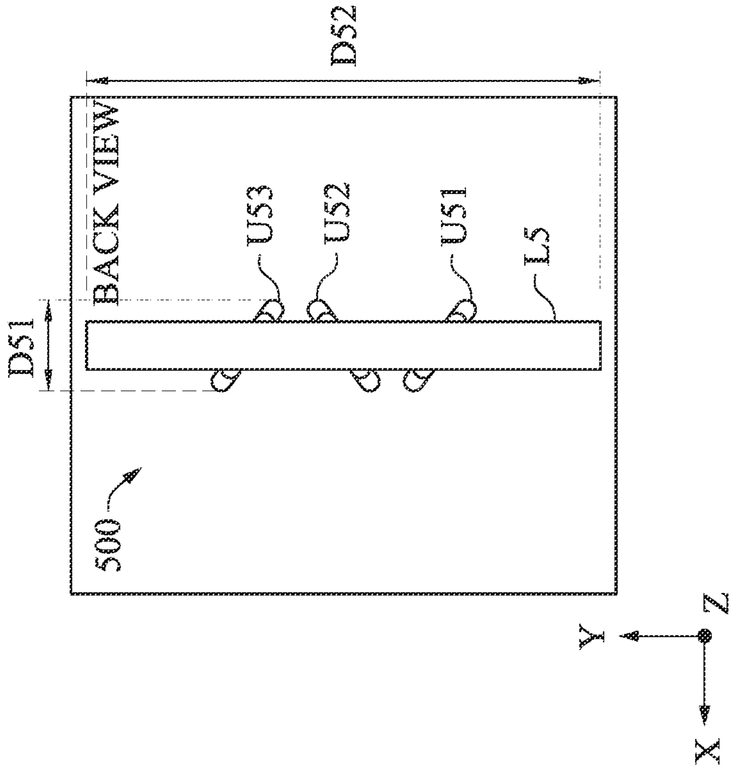
FIG. 5B is a back view diagram of an antenna device illustrated according to one embodiment of this disclosure.
Figure 5A:
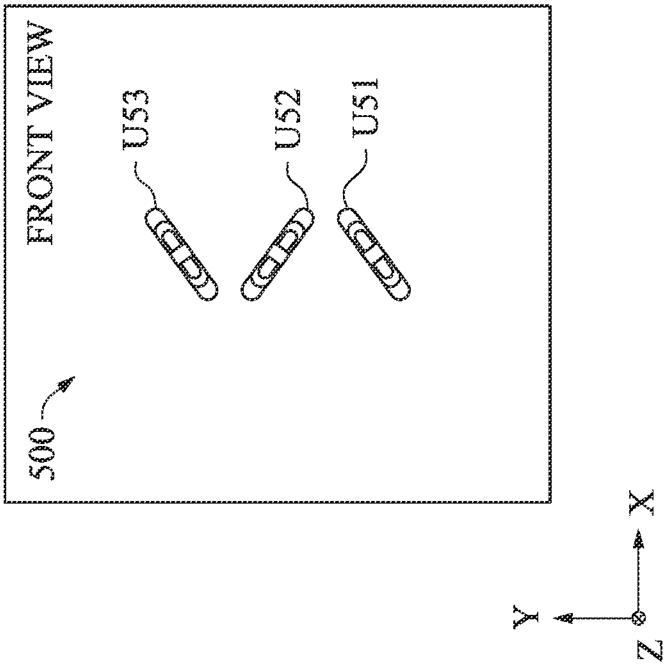
FIG. 5A is a front view diagram of an antenna device illustrated according to one embodiment of this disclosure.

FIG. 5A is a front view diagram of an antenna device 500 illustrated according to one embodiment of this disclosure. The antenna device 500 is an alternative embodiment of the antenna device 100 shown in FIG. 1A.

The front view diagram shown in FIG. 5A includes an X axis, a Y axis and a Z axis which are perpendicular to each other. The X axis, the Y axis and the Z axis correspond to the X direction, the Y direction and the Z direction, respectively. In FIG. 5A, the Z direction is the direction pointing out from the paper.

As illustratively shown in FIG. 5A, the antenna device 500 includes antenna units U51-U53. The antenna units U51-U53 are arranged in the Y direction in order. Long sides of the antenna units U51 and U53 are parallel with respect to each other. An angle between each of the long sides of the antenna units U51 and U53 and the X axis is substantially equal to 45 degrees. An angle between a long side of the antenna unit U52 and the X axis is substantially equal to 135 degrees. An angle between the antenna units U51 and U52 is substantially equal to 90 degrees, and an angle between the antenna units U53 and U52 is substantially equal to 90 degrees.

FIG. 5B is a back view diagram of an antenna device 500 illustrated according to one embodiment of this disclosure.

The back view diagram shown in FIG. 5B includes the X axis, the Y axis and the Z axis which are perpendicular to each other. The X axis, the Y axis and the Z axis correspond to the X direction, the Y direction and the Z direction, respectively. In FIG. 5B, the Z direction is the direction pointing into the paper.

As illustratively shown in FIG. 5B, the antenna device 500 includes the antenna units U51-U53 and a feed-in line L5. The feed-in line L5 has a length D51 in the X direction, and has a length D52 in the Y direction. In some embodiments, the length D51 is approximately 0.15 times of the wave length of a signal generated by the antenna device 500, and the length D52 is approximately 0.5 times of the wave length of the signal generated by the antenna device 500. In various embodiments, the lengths D51 and D52 may have various lengths.

In some embodiments, the feed-in line L5 is configured to provide driving signals to the antenna units U51-U53, such that the antenna units U51-U53 generate corresponding polarized signals.

As illustratively shown in FIG. 5B, the feed-in line L5 is parallel with the Y direction and perpendicular to the X direction. The antenna units U51-U53 are disposed on the feed-in line L5 in the Y direction in order, and configured to receive the driving signals from the feed-in line L5.

In some embodiments, when the antenna units U51 and U53 receive the driving signals, each of the antenna units U51 and U53 is configured to generate a linear polarized signal which has an angle with 45 degrees with respect to the X axis, and the antenna unit U52 is configured to generate a linear polarized signal which has an angle with 135 degrees with respect to the X axis.

In some embodiments, the antenna units U51 and U52 are configured to generate the right circular polarized signals which are parallel with the X-Y surface, and the antenna units U53 and U52 are configured to generate the left circular polarized signals which are parallel with the X-Y surface.

In some embodiments, the feed-in line L5 is further configured to provide control signals to one or more of the antenna units U51-U53, to enable or disable the one or more of the antenna units U51-U53, such that the antenna device 500 generates different polarized signals corresponding to different turned on or turned off states of the antenna units U51-U53. For example, when the antenna unit U51 is turned off and the antenna units U52 and U53 are turned on, the antenna device 500 generates a left circular polarized signal by the antenna units U52 and U53. In contrast, when the antenna unit U53 is turned off and the antenna units U51 and U52 are turned on, the antenna device 500 generates a right circular polarized signal by the antenna units U51 and U52.

Figure 6:
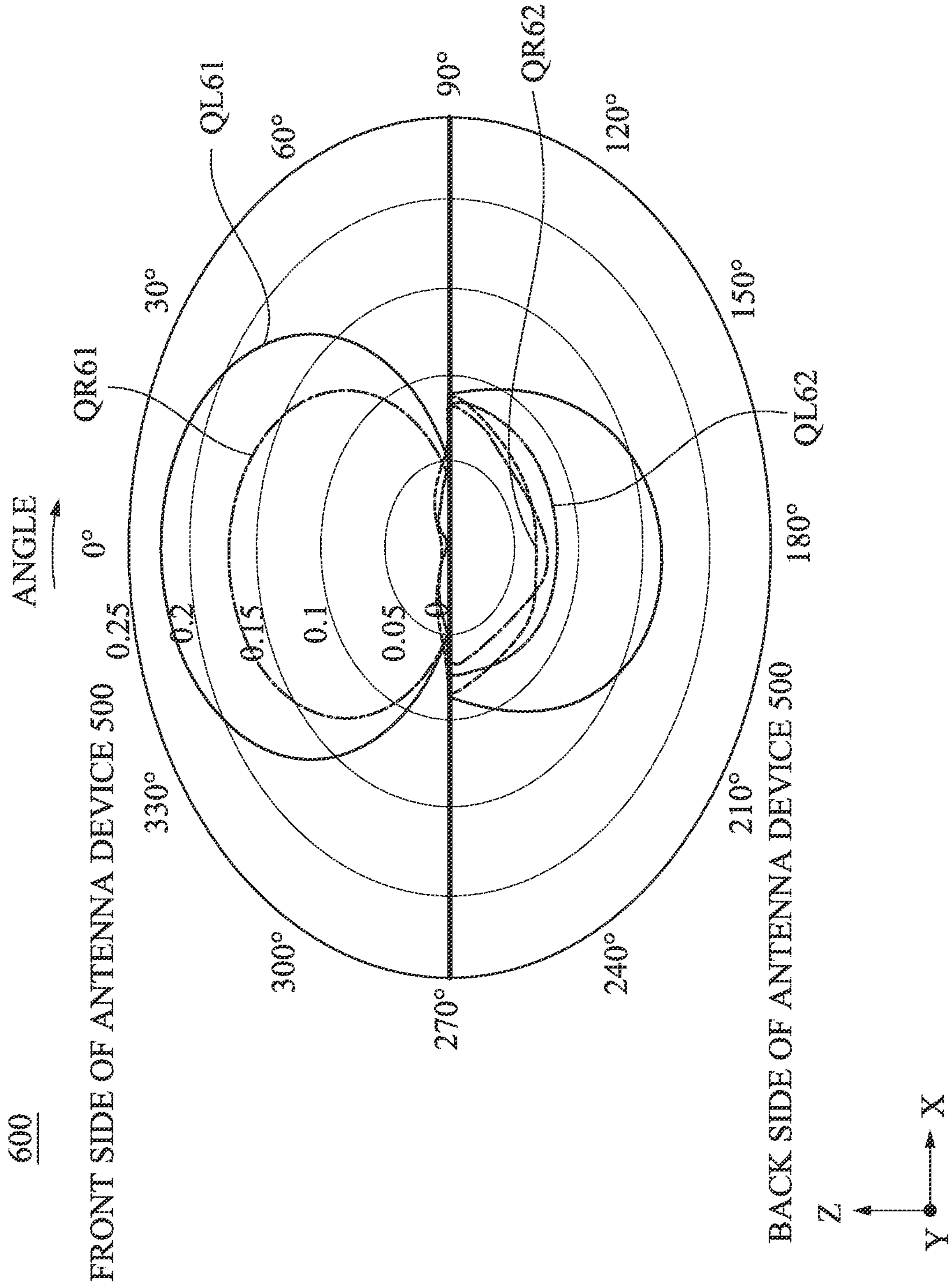
FIG. 6 is a schematic diagram of antenna features of an antenna device illustrated according to one embodiment of this disclosure.

FIG. 6 is a schematic diagram 600 of antenna features of the antenna device 500 illustrated according to one embodiment of this disclosure. The schematic diagram 600 includes an X axis, a Y axis and a Z axis which are perpendicular to each other. The X axis, the Y axis and the Z axis correspond to the X direction, the Y direction and the Z direction, respectively. In FIG. 6, the Y direction is the direction pointing out from the paper. Referring to FIG. 5A and FIG. 6, the schematic diagram 600 corresponds to signal intensities at different angles on the X-Z surface as observing the antenna device 500 from the Y direction. In some embodiments, the position of the antenna device 500 corresponds to the center of the schematic diagram 600.

As illustratively shown in FIG. 6, the schematic diagram 600 includes curves QL61, QL62, QR61 and QR62. Referring to FIG. 5A and FIG. 6, the curve QL61 corresponds to a signal intensity of a left circular polarized signal generated by the antenna device 500 when the antenna unit U51 is turned off and the antenna units U53 and U52 are turned on. The curve QL62 corresponds to a signal intensity of a right circular polarized signal generated by the antenna device 500 when the antenna unit U51 is turned off and the antenna units U53 and U52 are turned on. The curve QR61 corresponds to a signal intensity of a right circular polarized signal generated by the antenna device 500 when the antenna unit U53 is turned off and the antenna units U52 and U51 are turned on. The curve QR62 corresponds to a signal intensity of a left circular polarized signal generated by the antenna device 500 when the antenna unit U53 is turned off and the antenna units U52 and U51 are turned on.

As shown by the curves QL61 and QL62, when the antenna unit U51 is turned off and the antenna units U53 and U52 are turned on, the signal intensity of the left circular polarized signal is larger than the signal intensity of the right circular polarized signal. In some embodiments, a mode that the antenna unit U51 is turned off and the antenna units U53 and U52 are turned on is referred to as a left circular polarized mode of the antenna device 500.

As shown by the curves QR61 and QR62, when the antenna unit U53 is turned off and the antenna units U52 and U51 are turned on, the signal intensity of the right circular polarized signal is larger than the signal intensity of the left circular polarized signal. In some embodiments, a mode that the antenna unit U53 is turned off and the antenna units U52 and U51 are turned on is referred to as a right circular polarized mode of the antenna device 500.

In some embodiments, in the left circular polarized mode of the antenna device 500, the signal intensity of the left circular polarized signal is 290 times of the signal intensity of the right circular polarized signal. In the right circular polarized mode of the antenna device 500, the signal intensity of the right circular polarized signal is 175 times of the signal intensity of the left circular polarized signal. In some embodiments, one may consider that the antenna device 500 generates the left circular polarized signal and does not generate the right circular polarized signal in the left circular polarized mode, and the antenna device 500 generates the right circular polarized signal and does not generate the left circular polarized signal in the right circular polarized mode.

In some embodiments, the feed-in line L5 controls the antenna device 500 to be switched between the left circular polarized mode and the right circular polarized mode by the control signals, such that the antenna device 500 generates the left circular polarized signal or the right circular polarized signal according to the control signals.

In some embodiments, the antenna devices 100, 300 and 500 shown in FIGS. 1A, 3A and 5A are further configured to receive polarized signals, such as signals emitted by satellites. In some embodiments, after the antenna devices 100, 300 and 500 receive the signals, the signals are transmitted to a processor by the feed-in line L1, L3 and L5.

In some previous approaches, the antenna device generates signals by a mechanical bi-circular polarization antenna, and generates left circular polarized signals or right circular polarized signals by changing mechanical structures.

Compared to the above approaches, in some embodiments of the present disclosure, the antenna devices 100, 300 and 500 may be implemented by flat antennas. The antenna devices 100, 300 and 500 are less likely to affect the streamline and the wind resistance of an object. Furthermore, costs of maintenance and repairment of the antenna devices 100, 300 and 500 are lower.

In summary, in some embodiments of the present disclosure, the antenna devices 100, 300 and 500 can be switched between different modes of the left circular polarized signals and the right circular polarized signals, and have better performance on the shape and the cost of a product.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna device, comprising:
- a first antenna unit;
- a second antenna unit, wherein an angle between the second antenna unit and the first antenna unit is substantially equal to 90 degrees;
- a third antenna unit, wherein an angle between the third antenna unit and the second antenna unit is substantially equal to 90 degrees; and
- a feed-in line crossing over each of the first antenna unit, the second antenna unit and the third antenna unit in a view, and configured to turn on and turn off each of the first antenna unit, the second antenna unit and the third antenna unit,
- wherein the first antenna unit and the second antenna unit are configured to generate a first polarized signal,
- the third antenna unit and the second antenna unit are configured to generate a second polarized signal, and
- the first polarized signal and the second polarized signal have different polarizations.

2. The antenna device of claim 1, wherein the feed-in line extends along a direction, and
- the first antenna unit, the second antenna unit and the third antenna unit are arranged in order along the direction.

3. The antenna device of claim 1, wherein the feed-in line comprises:
- a first feed-in line portion extending along a first direction and crossing over the second antenna unit in the view; and
- a second feed-in line portion extending along a second direction and crossing over each of the first antenna unit and the third antenna unit in the view.

4. The antenna device of claim 3, wherein the first feed-in line portion is disposed along the first direction.

5. The antenna device of claim 3, wherein the second feed-in line portion is disposed along the second direction.

6. The antenna device of claim 3, wherein the first feed-in line portion is disposed between the second antenna unit and the third antenna unit in the view.

7. The antenna device of claim 1, wherein the antenna device is configured to generate a signal having a wave length, has a first length along a first direction, and has a second length along a second direction perpendicular to the first direction,
- the first length is approximately 0.7 times of the wave length, and
- the second length is approximately 0.5 times of the wave length.

8. The antenna device of claim 1, wherein the feed-in line extends along a first direction, and
- along a second direction different from the first direction.

9. The antenna device of claim 1, wherein the antenna device is configured to generate a signal having a wave length, has a first length along a first direction, and has a second length along a second direction perpendicular to the first direction,
- the first length is approximately 0.15 times of the wave length, and
- the second length is approximately 0.5 times of the wave length.

10. The antenna device of claim 1, wherein in the view,
- an angle between a long side of the first antenna unit and an axis is approximately equal to 45 degrees,
- an angle between a long side of the second antenna unit and the axis is approximately equal to 135 degrees, and
- the feed-in line is approximately perpendicular to the axis.

11. The antenna device of claim 1, wherein
- the first antenna unit, the second antenna unit and the third antenna unit are arranged in order along a direction.

12. A method of manufacturing an antenna device, comprising:
- disposing a first antenna unit;
- disposing a second antenna unit approximately perpendicular to the first antenna unit;
- disposing a third antenna unit approximately parallel with the first antenna unit; and
- disposing a feed-in line crossing over each of the first antenna unit, the second antenna unit and the third antenna unit in a view,
- wherein the feed-in line is configured to enable and disable each of the first antenna unit, the second antenna unit and the third antenna unit,
- the first antenna unit and the second antenna unit are configured to generate a first polarized signal,
- the third antenna unit and the second antenna unit are configured to generate a second polarized signal, and
- the first polarized signal and the second polarized signal have different polarizations.

13. The method of claim 12, wherein the feed-in line extends along a first direction, and
- the first antenna unit, the second antenna unit and the third antenna unit are arranged in order along the first direction.

14. The method of claim 12, wherein disposing the feed-in line comprises:
- disposing a first feed-in line portion crossing over the second antenna unit in the view; and
- disposing a second feed-in line portion perpendicular to the first feed-in line portion and crossing over each of the first antenna unit and the third antenna unit in the view.

15. The method of claim 14, wherein the first feed-in line portion is disposed along a second direction.

16. The method of claim 14, wherein the second feed-in line portion is disposed along the first direction.

* * * * *